US008868749B2

(12) United States Patent
Bartfai-Walcott et al.

(10) Patent No.: US 8,868,749 B2
(45) Date of Patent: Oct. 21, 2014

(54) WORKLOAD PLACEMENT ON AN OPTIMAL PLATFORM IN A NETWORKED COMPUTING ENVIRONMENT

(75) Inventors: Katalin K. Bartfai-Walcott, El Dorado Hills, CA (US); Gregory J. Boss, Saginaw, MI (US); Christopher J. Dawson, Arlington, VA (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/008,071

(22) Filed: Jan. 18, 2011

(65) Prior Publication Data

US 2012/0185868 A1 Jul. 19, 2012

(51) Int. Cl.
| | |
|---|---|
| *G06F 9/46* | (2006.01) |
| *G06F 15/173* | (2006.01) |
| *G06F 9/445* | (2006.01) |
| *G06F 11/34* | (2006.01) |

(52) U.S. Cl.
CPC ............ *G06F 9/445* (2013.01); *G06F 11/3414* (2013.01); *G06F 11/3433* (2013.01)
USPC .......................................... 709/226; 718/105

(58) Field of Classification Search
CPC .............................. G06F 9/445; G06F 11/3433
USPC .................... 709/223, 226; 718/105; 700/277
See application file for complete search history.

(56) References Cited

U.S. PATENT DOCUMENTS

| | | | |
|---|---|---|---|
| 6,880,002 B2 | 4/2005 | Hirschfeld et al. | |
| 7,092,985 B2 | 8/2006 | Hubbard | |
| 7,363,370 B2 | 4/2008 | Collazo | |
| 7,574,496 B2 | 8/2009 | McCrory et al. | |
| 7,730,205 B2 | 6/2010 | Rothman et al. | |
| 8,275,868 B2 * | 9/2012 | Rechterman ................... | 709/223 |
| 2003/0051021 A1 | 3/2003 | Hirschfeld et al. | |
| 2008/0184225 A1 | 7/2008 | Fitzgerald et al. | |
| 2009/0157998 A1 | 6/2009 | Batterywala | |
| 2009/0300149 A1 | 12/2009 | Ferris et al. | |
| 2009/0300210 A1 | 12/2009 | Ferris | |
| 2009/0313633 A1 | 12/2009 | Nardelli et al. | |

(Continued)

OTHER PUBLICATIONS

Beaumon et al., Scheduling Divisible Workloads on Heterogenous Platforms under Bounded Multi-Port Model, IEEE, 2008, pp. 1-7.*

(Continued)

*Primary Examiner* — Jung Park
*Assistant Examiner* — Albert Shih
(74) *Attorney, Agent, or Firm* — William E. Schiesser; Keohane & D'Alessandro, PLLC

(57) ABSTRACT

Embodiments of the present invention provide for optimizing workload placement in a networked computing environment (e.g., a cloud computing environment). Specifically, a workload placement technique is applied to determine an optimal platform for handling an identified workload. The workload placement technique comprises one or more of the following: a shadow placement technique; a simultaneous placement technique; and/or a single platform placement technique. Once an optimal platform is identified, a workload timing method may be applied to determine when the workload should be placed thereon. The workload timing method can comprise one or more of the following: a time-based method whereby the workload is placed on the optimal platform at a predetermined time or time interval; and/or an event-based method whereby the workload is placed on the optimal platform based on an occurrence of one or more events external to the workload itself.

20 Claims, 6 Drawing Sheets

(56) References Cited

U.S. PATENT DOCUMENTS

2010/0050172 A1     2/2010  Ferris
2011/0302286 A1*   12/2011  Parolini et al. ............... 709/223
2012/0158190 A1*    6/2012  Belady et al. ................. 700/277
2012/0173708 A1*    7/2012  Bartfai-Walcott et al. ... 709/224

OTHER PUBLICATIONS

Leinberger et al., Load Balancing Across Near-Homogeneous Multi-Resource Servers, 9th Heterogenous Computing Workship, 2000, pp. 1-12.*
Beaumont et al., Scheduling Divisible Workloads on Heterogeneous Platforms under BOunded Multi-Port Model, IEEE, 2008, pp. 1-7.*
Leinberger et al., Load Balancing Across Near-Homogeneous Multi-Resource Servers, 9th Heterogeneous Computing Workshop, 2000, pp. 1-12.*
Oriyano et al., Introduction to Software Load Balancing with Amazon EC2, Sep. 21, 2008, pp. 1-7.*
Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

* cited by examiner

WORKLOAD PLACEMENT ON AN OPTIMAL PLATFORM IN A NETWORKED COMPUTING ENVIRONMENT

TECHNICAL FIELD

The present invention generally relates to workload placement. Specifically, the present invention relates to workload placement techniques for identifying an optimal platform for handling a workload in a networked computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

Corporate and/or enterprise systems customers often make server purchase decisions based on the number of processors, size and speed versus cost, effective implementation, and/or usage parameters. In evaluating new server solutions, customers frequently consider processor numbers and speed as the key decision factors for accomplishing workload. Currently, operating system or application-based utilization tools are used to measure system and processor utilization. Output provided by these tools may then be graphed, statistically analyzed, reported, and correlated back to the original purchase criteria. However, in many complex environments, such as those surrounding networked (e.g., cloud) computing installations, these measurements may be insufficient, and additional functionality is needed to ascertain whether the server decision is correct for the system implementation and application load running on the server infrastructure.

SUMMARY

Embodiments of the present invention provide an approach for optimizing workload placement in a networked computing environment (e.g., a cloud computing environment). Specifically, under embodiments of the present invention, a workload placement technique is applied to determine an optimal platform for handling an identified workload. The workload placement technique can comprise one or more of the following: a shadow placement technique whereby the workload is placed on multiple similar platforms substantially contemporaneously; a simultaneous placement technique whereby the workload is placed on multiple different platforms substantially contemporaneously; and/or a single platform placement technique whereby the workload is placed on a single platform at a given time. Once an optimal platform is identified, a workload timing method may be applied to determine when the workload should be placed thereon. The workload timing method can comprise one or more of the following: a time-based method whereby the workload is placed on the optimal platform at a predetermined time or time interval; and/or an event-based method whereby the workload is placed on the optimal platform based on an occurrence of one or more events external to the workload itself (e.g., a certain CPU or memory consumption, etc.). Once the workload is placed on the optimal platform, optimization data can be gathered for future assessments.

A first aspect of the present invention provides a method for optimizing workload placement in a networked computing environment, comprising: identifying a workload in the networked computing environment; applying a workload placement technique to identify an optimal platform for handling the workload, the workload placement technique comprising at least one of the following: a shadow placement technique, a simultaneous placement technique, or a single platform placement technique; applying a workload timing method to determine an optimal time to place the workload on the optimal platform, the workload timing method comprising at least one of the following: a time-based method, or an event-based method; and placing the workload on the optimal platform at the optimal time.

A second aspect of the present invention provides a system for optimizing workload placement in a networked computing environment, comprising: a bus; a processor coupled to the bus; and a memory medium coupled to the bus, the memory medium comprising instructions to: identify a workload in the networked computing environment; apply a workload placement technique to identify an optimal platform for handling the workload, the workload placement technique comprising at least one of the following: a shadow placement technique, a simultaneous placement technique, or a single platform placement technique; apply a workload timing method to determine an optimal time to place the workload on the optimal platform, the workload timing method comprising at least one of the following: a time-based method, or an event-based method; and place the workload on the optimal platform at the optimal time.

A third aspect of the present invention provides a computer program product for optimizing workload placement in a networked computing environment, the computer program product comprising a computer readable storage media, and program instructions stored on the computer readable storage media, to: identify a workload in the networked computing environment; apply a workload placement technique to identify an optimal platform for handling the workload, the workload placement technique comprising at least one of the following: a shadow placement technique, a simultaneous placement technique, or a single platform placement technique; apply a workload timing method to determine an optimal time to place the workload on the optimal platform, the workload timing method comprising at least one of the following: a time-based method, or an event-based method; and place the workload on the optimal platform at the optimal time.

A fourth aspect of the present invention provides a method for deploying a system for optimizing workload placement in a networked computing environment, comprising: deploying a computer infrastructure being operable to: identify a workload in the networked computing environment; apply a workload placement technique to identify an optimal platform for handling the workload, the workload placement technique comprising at least one of the following: a shadow placement technique, a simultaneous placement technique, or a single platform placement technique; apply a workload timing method to determine an optimal time to place the workload on the optimal platform, the workload timing method comprising at least one of the following: a time-based method, or an event-based method; and place the workload on the optimal platform at the optimal time.

BRIEF DESCRIPTION OF THE DRAWINGS

These and other features of this invention will be more readily understood from the following detailed description of the various aspects of the invention taken in conjunction with the accompanying drawings in which.

Figure 1:
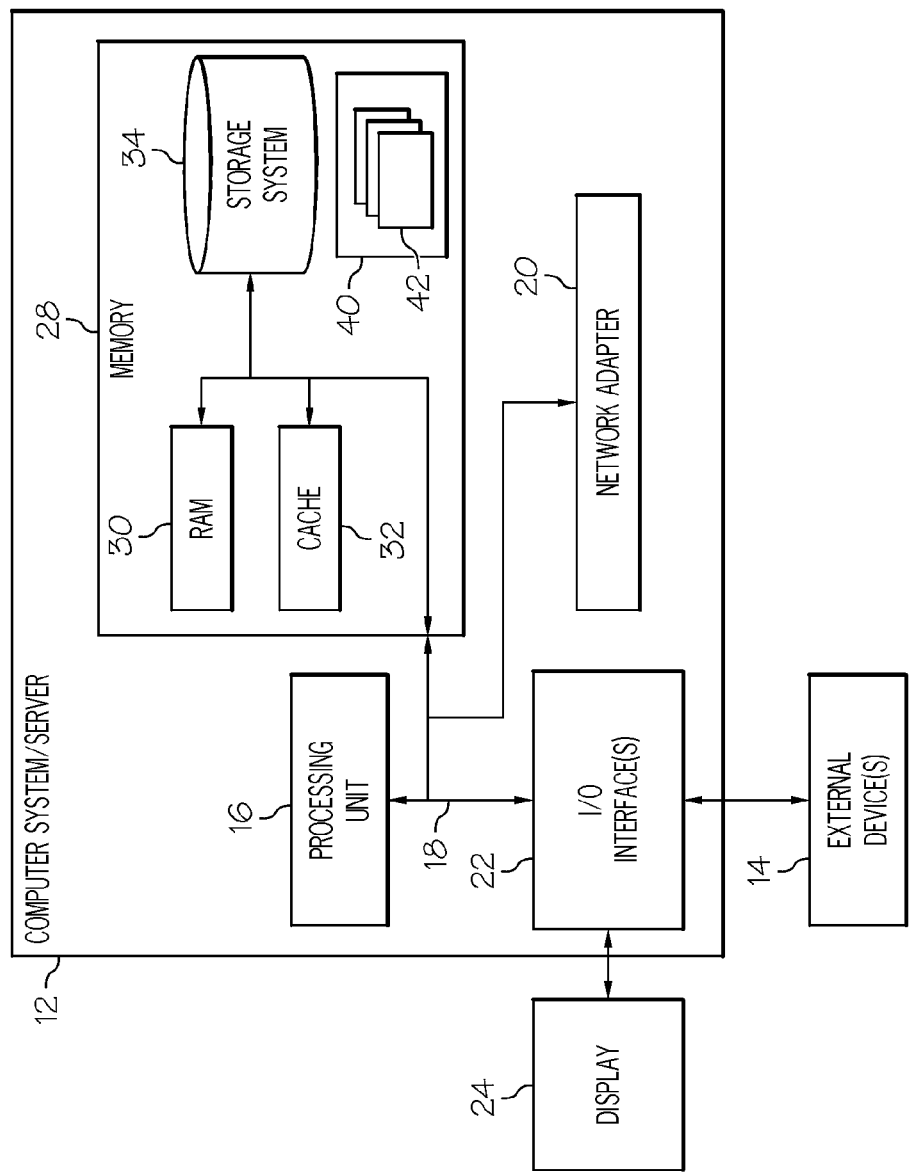
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for optimizing workload placement in a networked computing environment (e.g., a cloud computing environment). Specifically, under embodiments of the present invention, a workload placement technique is applied to determine an optimal platform for handling an identified workload. The workload placement technique can comprise one or more of the following: a shadow placement technique whereby the workload is placed on multiple similar platforms substantially contemporaneously; a simultaneous placement technique whereby the workload is placed on multiple different platforms substantially contemporaneously; and/or a single platform placement technique whereby the workload is placed on a single platform at a given time. Once an optimal platform is identified, a workload timing method may be applied to determine when the workload should be placed thereon. The workload timing method can comprise one or more of the following: a time-based method whereby the workload is placed on the optimal platform at a predetermined time or time interval; and/or an event-based method whereby the workload is placed on the optimal platform based on an occurrence of one or more events external to the workload itself (e.g., a certain CPU or memory consumption, etc.). Once the workload is placed on the optimal platform, optimization data can be gathered for future assessments.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Workload optimization program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
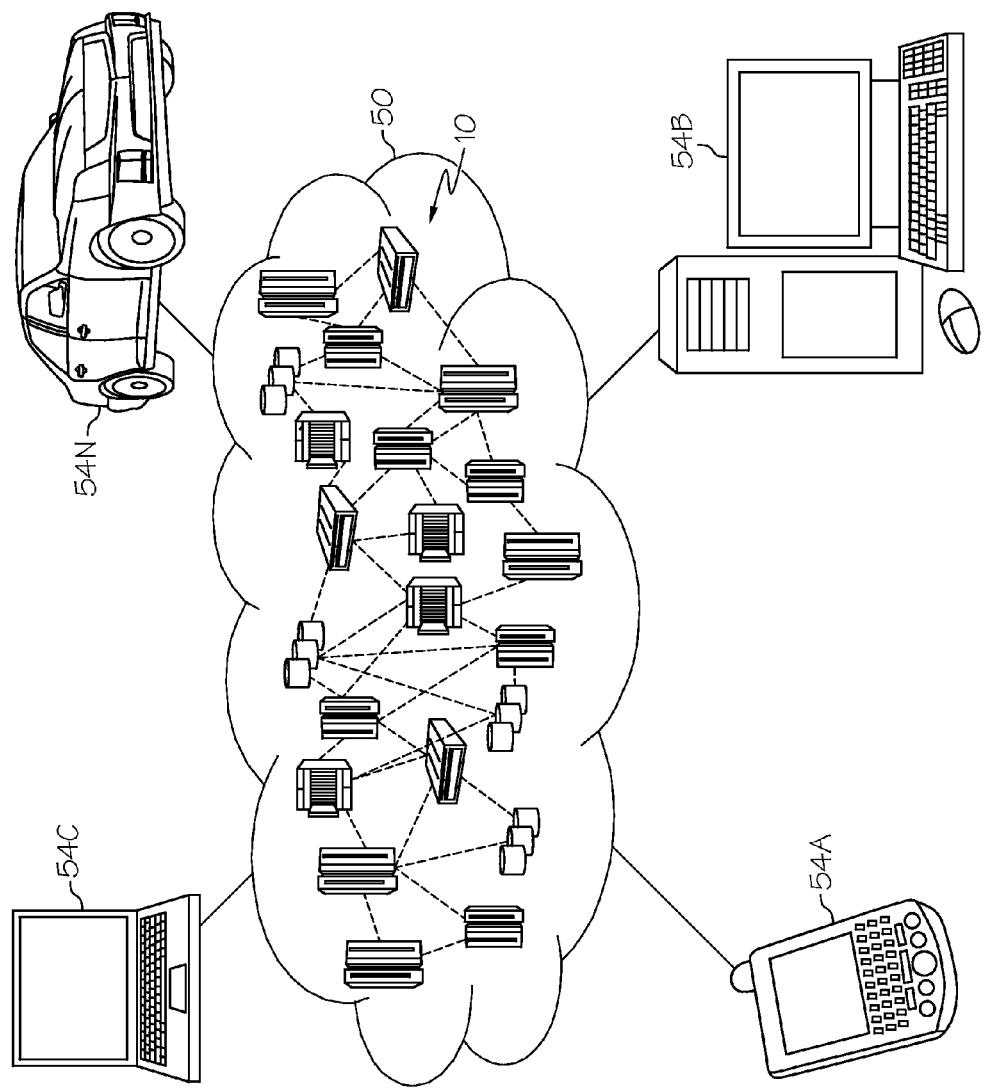
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
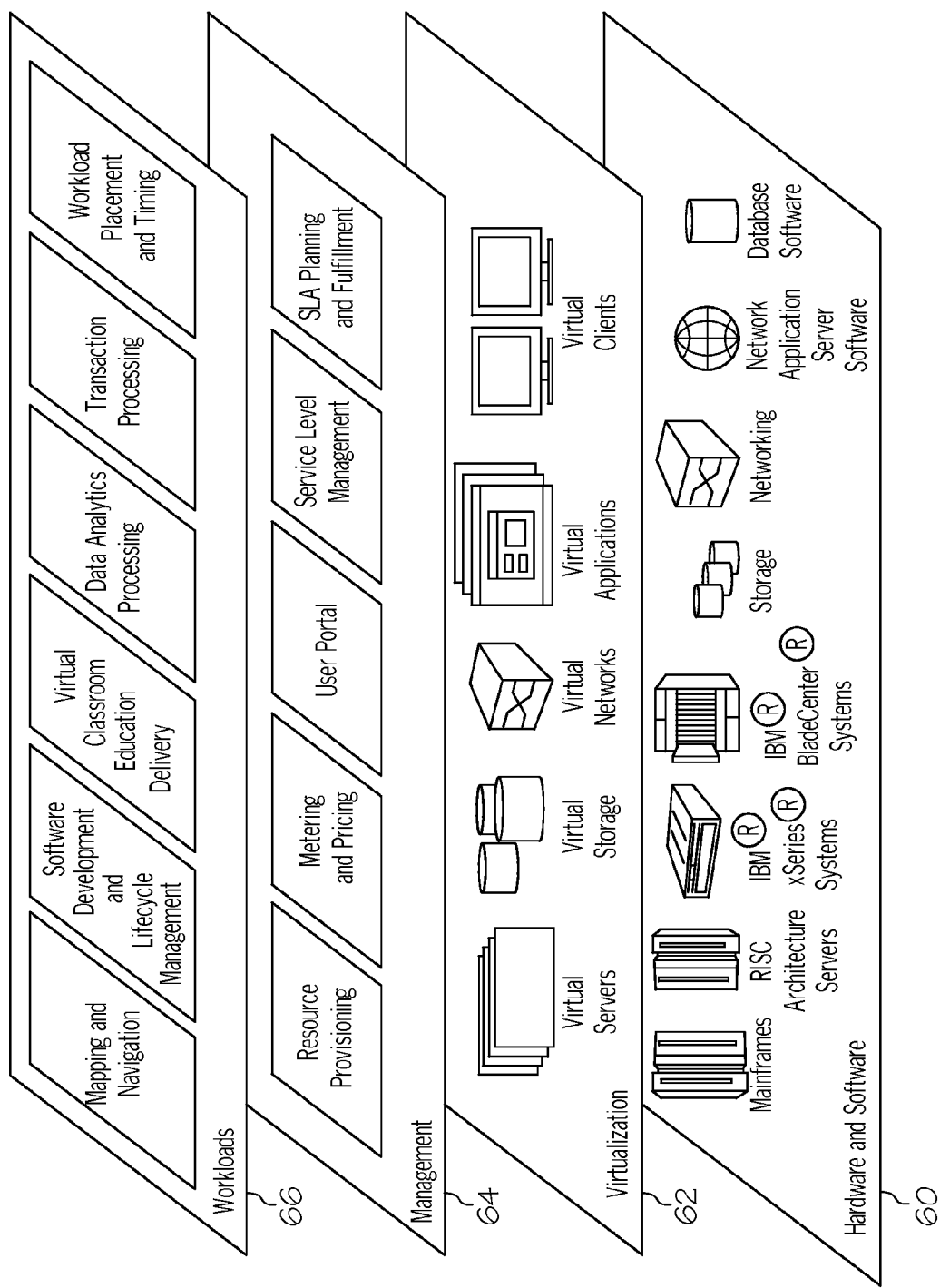
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

Management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload placement and timing. As mentioned above, all of the foregoing examples described with respect to FIG. 3 are illustrative only, and the invention is not limited to these examples.

It is understood all functions of the present invention as described herein are typically performed by the workload placement and timing function, which can be tangibly embodied as modules of program code 42 of workload optimization program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide an approach for optimizing a workload. Specifically, embodiments of the present invention allow for application of a workload placement technique to identify an optimal platform for handling a workload, and for application of a workload timing technique to identify an optimal time for placing the workload on the optimal platform.

Workload Placement Techniques

The following describes illustrative techniques for identifying an optimal platform for placing/handling a workload.

Shadow placement: Shadow placement describes a scenario whereby a workload manager (e.g., workload optimization program/utility 40) will provision a second resource (e.g., platform) which may be similar or identical to the original, but which is isolated from the original (e.g., via VLAN and or firewall). Specifically, a workload can be simultaneously placed on a second instance of the same resource substantially contemporaneously. This second server or virtual machine may optionally be unknown to the owner of the original cloud request and could be short lived. This "shadow copy" will be used to collect performance criteria, without impacting the primary resource. One advantage of this type of system is that it is not interfering with or impacting the normal operations of the server, while still collecting valuable information that the service provider and/or customer can use for problem determination, as well as return-on-investment evaluation. Furthermore, the workload manager can proactively make server type and architecture recommendations for specific requirements and implementations even if it requires a vendor to recommend another processor type or processor/system implementation versus the one initially purchased or allocated.

Simultaneous placement method: In this technique, the workload may be placed upon multiple "possibly optimal" platforms substantially contemporaneously (e.g., at job onset). That is, the workload can be placed on multiple different resources (e.g., platforms). Production workload may then be either distributed via round-robin fashion between the platforms as simulations are run on other platforms, or the production workload may be run on one chosen platform, while non-production simulations are executed on the other "possibly optimal" platforms. In either of these cases, the platform offering the best production performance may be chosen after a test period.

Single entity placement technique: In this methodology, the workload is not copied (shadow placement) or duplicated (simultaneous placement) but is kept intact and moved from platform to platform. This would typically be done using some type of non-interruptive live migration capability and would typically be done for lower priority and less important workloads. This method has an advantage of requiring no additional cloud resources.

Figure 4:
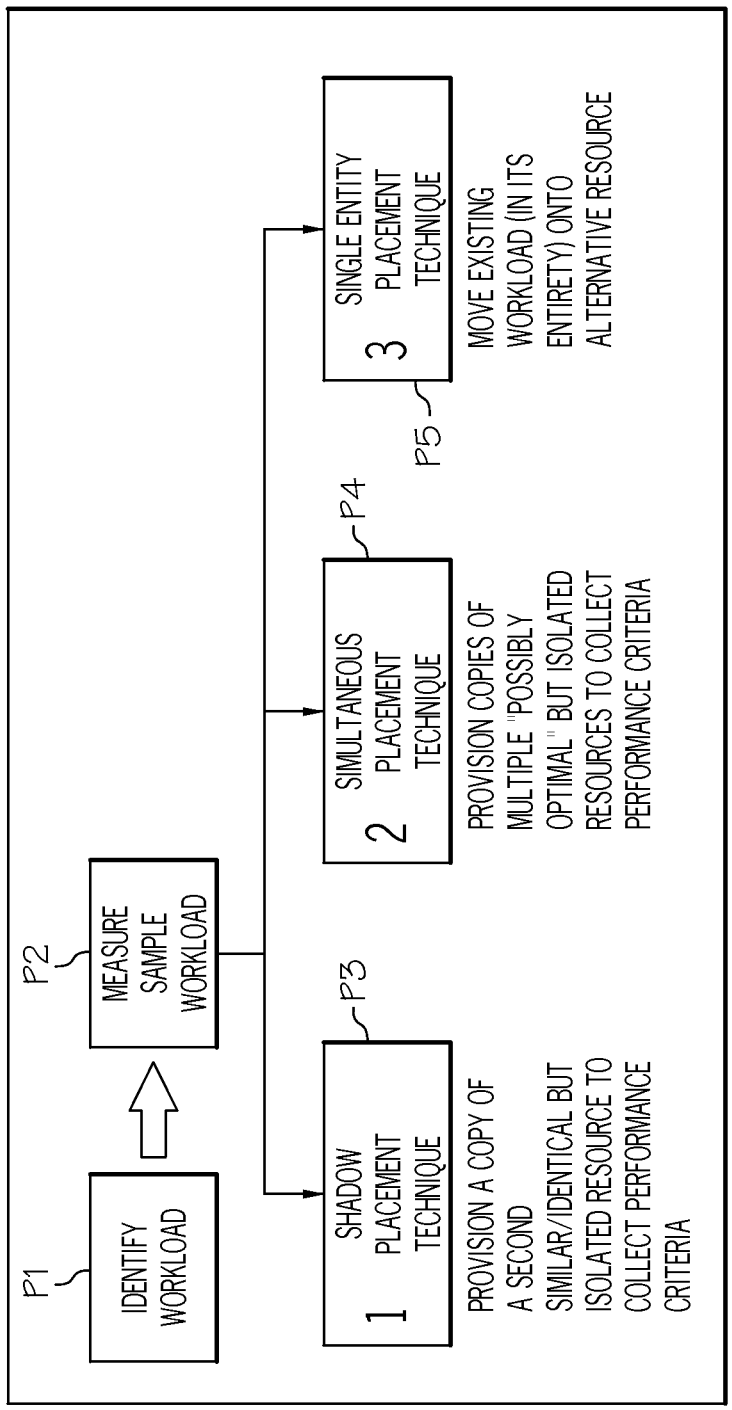
FIG. 4 depicts a process flow diagram of workload placement techniques according to an embodiment of the present invention.

Referring to FIG. 4, a process flow diagram depicting the workload placement techniques discussed above is shown. As depicted, in step P1, an existing cloud workload is identified, and a sample thereof is measured in step P2. In measuring the workload or a sample thereof, a set of performance measurements/metrics can be utilized. Such metrics can include one or more of the following: response time, throughput, energy consumed, etc. Regardless, in steps P3-P5, the above-described workload placement techniques can be applied. Specifically, in step P3, the shadow placement technique can be applied, in step P4, the simultaneous placement technique can be applied, and in step P5 the single entity placement technique can be applied. It is noted that it is not necessary for just one of the techniques to be applied. Rather, workload placement and timing program/utility 40 can apply more than one (e.g., all) of the techniques as a form of redundancy and/or double-checking.

Workload Timing Methods

The following describes illustrative techniques for identifying an optimal time for placing/handling a workload using the above-referenced techniques.

Time-based movement method: The time-based placement method involves taking an identified workload and its associated platform (hardware plus operating system, and, optionally, any required software stack components) and preemptively creating shadow copies at predetermined intervals. Each time-based interval will result in another set of performance metrics collected, and each interval will result in a different combination of the IaaS and SaaS stack. For example, "Workload A" may get provisioned on Platform 1 initially. The time-based shadow placement method might create a second copy of "Workload A" ten minutes later, but this time on Platform B where another performance metric will be collected and stored. Subsequent creation of additional "possibly optimal" platforms can occur periodically, such that sufficient empirical data may be collected to ascertain which combination offers the best performance.

Event-based movement method: Event-based placement methods are similar in design to time-based, but the mechanism to decide when to create the shadow copy (and how often) is based on occurrence of external events. The method involves monitoring for an event like a CPU spike or high disk activity. Performance data would be collected to support such event triggers. After such an event, the system creates a shadow copy on a different IaaS stack and continues to monitor for the same event. Again, various "possibly optimal" platforms are created, so that sufficient data can be collected to determine optimal placement of workloads.

Figure 5:
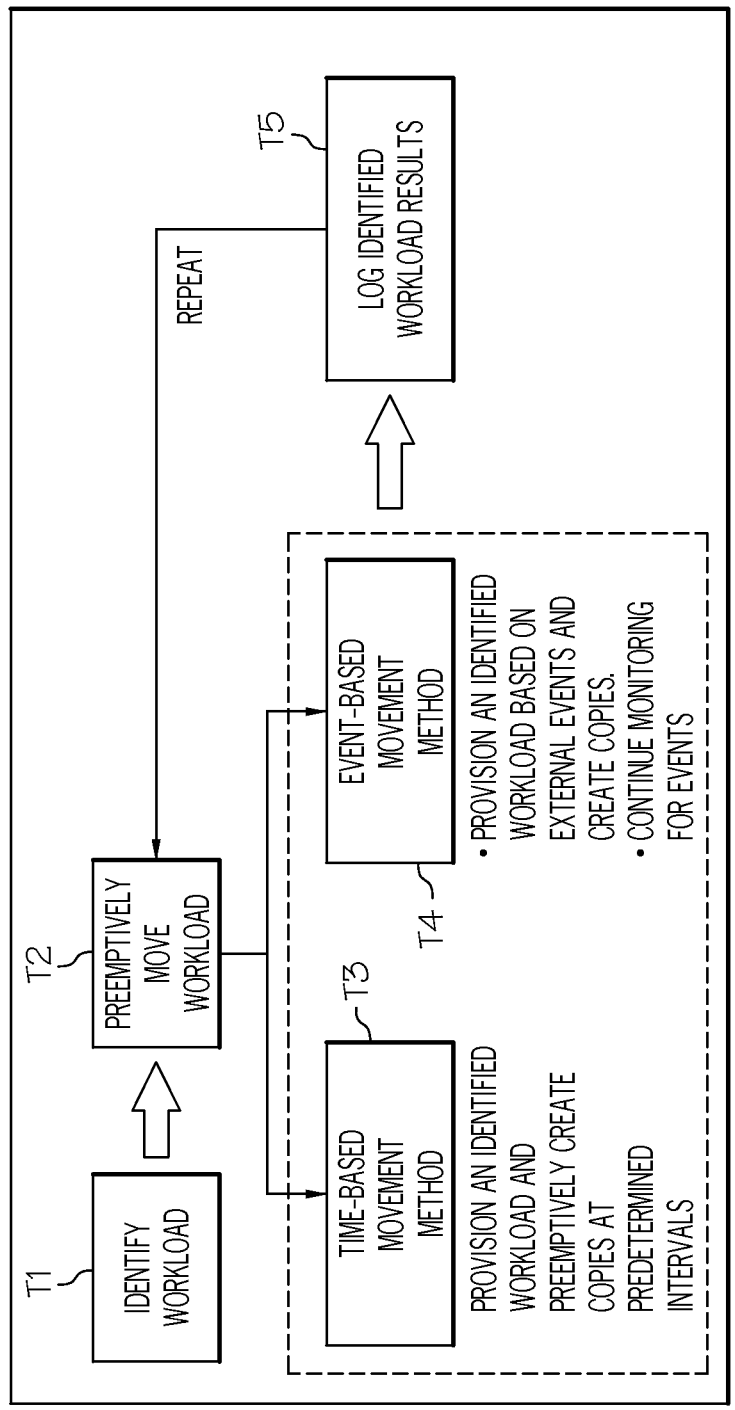
FIG. 5 depicts a process flow diagram of workload timing methods according to an embodiment of the present invention.

Referring now to FIG. 5, a process flow diagram of the above-described workload timing methods is shown. As depicted, in step T1, a workload is identified. In step T2, the workload can be preemptively moved to the optimal platform. Specifically, in steps T3-T4, one or more of the above-discussed workload timing methods can be applied. Specifically, in step T3, the time-based movement method is applied whereby the copies of the workload can be placed (e.g., for shadow and/or simultaneous placement) at predetermined time intervals. In step T4, the workload can be placed according to the event-based method whereby one or more events external to the workload itself (e.g., CPU and/or memory usage) trigger such placement. Once the workload is placed, associated data (e.g., optimization data, performance data, etc.) can be gathered and logged in step T5.

Illustrative Examples

Example 1

Time-based placement method. In this case, workload A is placed on Platform 1 for performance testing during production loads. Its performance is monitored for some period of time, and baselines established accordingly. At some predetermined time, workload A is placed on Platform 2 for performance testing against production loads. Its performance is monitored for some period of time, and baselines established accordingly. For each "possibly optimal" platform, this process repeats itself, until baseline performance measurements are established. Optionally, in each case, consideration may be made as to whether the production load was indicative of normal operation. For example, certain times of day may see certain transaction types being more common than others. In addition, the workload may optionally be placed on subsequent platforms (e.g., Platform 2, 3, etc.) may be an actual production load, or it may be a simulation of the production load, derived from the empirical load placed upon the running production platform. Still yet, once a given platform is ascertained to be inferior to a previously tested platform, the test may be discontinued, and the workload either pass to the next "possibly optimal" platform or, if a decision has been reached, the workload may be returned to the chosen optimal platform. At such a time that production performance metrics have been generated for each load, a decision is made as to which platform offers the best affinity for the workload type. The workload may be shifted to this platform in real-time (ideally) and saved for future use, or in some embodiments, this information may be stored for future workloads and future provisioning requests.

Example 2

Event-based placement method. In this case, workload A is placed on Platform 1 for performance testing during production loads. Its performance is monitored until some trigger event, and baselines established accordingly. Trigger events may be performance bottlenecks, incoming workload spikes of various kinds, or even competing "external" jobs which might need the same platform (e.g., for the final case, another job type with an affinity for Platform 1 might arrive, forcing the test case to be moved to the next "possibly optimal" platform). After this trigger event, workload A is placed on Platform 2 for performance testing against production loads. Its performance is again monitored and baselines established accordingly. For each "possibly optimal" platform, this process repeats itself, until baseline performance measurements are established. Consideration may be made as to whether the production load was indicative of normal operation. For example, certain times of day may see certain transaction types be more common than others. Moreover, the workload may optionally be placed on subsequent platforms (e.g., platform 2, 3, etc.), the workload may be an actual production load, or the workload may be a simulation of the production load, derived from the empirical load placed upon the running production platform. Still yet, once a given platform is ascertained to be inferior to a previously tested platform, the test may be discontinued and the workload either passed to the next "possibly optimal" platform or if a decision has been reached, the workload may be returned to the chosen optimal platform. At such a time that production performance metrics have been generated for each load, a decision is made as to which platform offers the best affinity for the workload type. The workload may be shifted to this platform in real-time (ideally) and saved for future use, or, in some embodiments, this information may be stored for future workloads and future provisioning requests.

Example 3

Simultaneous placement method. In this case, workload A is placed on Platform 1 for performance testing during production loads. Its performance is monitored, and baselines established accordingly. Simultaneously or near-simultaneously, workload A, or a simulation thereof, is placed on platform 2 for performance testing during production loads. Its performance is monitored and baselines established accordingly. Simultaneously or near-simultaneously, for each "possibly optimal" platform, this process repeats itself, until baseline performance measurements are established. As previously mentioned, the actual production load may be rotated between platforms, as simulations of production load are run on the other platforms. Alternatively, the actual production load may be run on one platform (only), while simulations are executed on the other platforms. Optionally, in each case, consideration may be made as to whether the production load was indicative of normal operation. For example, certain times of day may see certain transaction types be more common than others. Moreover, once a given platform is ascertained to be inferior to a previously tested platform, the test may be discontinued and that platform removed from consideration. In each of these cases, the workload can be shifted from system to system through live transfer. However, it is also noted that other legacy "disruptive" transfer methods may likewise be used.

Figure 6:
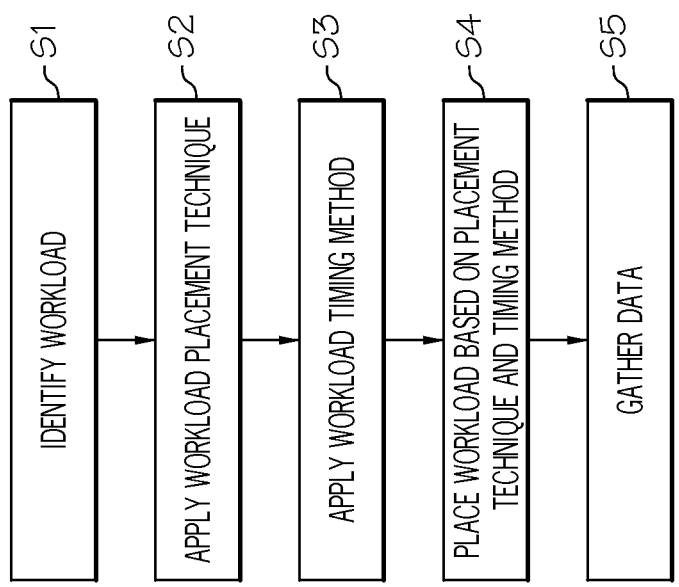
FIG. 6 depicts a method flow diagram according to an embodiment of the present invention.

Referring now to FIG. 6, a method flow diagram according to the present invention is shown. In step S1, a workload is identified in the networked computing environment. In step S2, a workload placement technique is applied to identify an optimal platform for handling the workload. As indicated above, the workload placement technique can comprise at least one of the following: a shadow placement technique, a simultaneous placement technique, or a single platform placement technique. In step S3, a workload timing method is applied to determine an optimal time to place the workload on the optimal platform, the workload timing method comprising at least one of the following: a time-based method, or an event-based method. Is step S4, the workload can be placed on the optimal platform at the optimal time. In step S5, data (e.g., optimization data, performance data) of the workload as run on the platform(s) on which it is placed is gathered.

While shown and described herein as a workload placement and timing solution, it is understood that the invention further provides various alternative embodiments. For example, in one embodiment, the invention provides a computer-readable/useable medium that includes computer program code to enable a computer infrastructure to provide workload placement and timing functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide workload placement and timing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for workload placement and timing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for optimizing workload placement in a networked cloud computing environment, comprising:
   identifying a workload on an initial platform in the networked cloud computing environment, the networked cloud computing environment comprising at least one cloud network;
   applying a workload placement technique to identify an optimal platform from multiple different platforms in the at least one cloud network for handling the workload, the workload placement technique comprising an implementation of a plurality of the following: a shadow placement technique, a simultaneous placement technique, and a single platform placement technique, wherein the shadow placement technique comprises a placement of the workload on multiple platforms, wherein the simultaneous placement technique comprises a placement of an entirety of the workload on one platform of the multiple different platforms substantially contemporaneously with simulations of the entirety of the workload on platforms of the multiple different platforms other than the one platform in the at least one cloud network, and wherein the single platform placement technique comprises a placement of the workload on a first single platform of the multiple different platforms in the at least one cloud network in a first time interval and a migration of the workload directly from the first single platform to a second single platform of the multiple different platforms in the at least one cloud network in a second time interval;
   applying a workload timing method to determine an optimal time to place the workload on the optimal platform in the at least one cloud network, the workload timing method comprising monitoring for a performance bottleneck on the initial platform, wherein the optimal time comprises a time at which an occurrence of the performance bottleneck is detected by the monitoring; and
   placing the workload on the optimal platform in the at least one cloud network at the optimal time.

2. The method of claim 1, further comprising gathering optimization data based on the workload as placed on the optimal platform.

3. The method of claim 1, the simultaneous placement technique further comprising at least one of:
   rotating the placement of the entirety of the workload among the multiple different platforms via a round-robin fashion as non-production simulations of the entirety of the workload are executed on platforms other than the platform on which the entirety of the workload is currently placed, or
   placing the entirety of the workload on a platform of the multiple different platforms as non-production simulations of the entirety of the workload are executed on platforms other than the platform on which the entirety of the workload is placed.

4. The method of claim 1, further comprising:
   establishing baseline performance measurements for each of the first single platform and the second single platform based on performance of the workload on the each of the first single platform and the second single platform; and
   determining the optimal platform based on the baseline performance measurements.

5. The method of claim 4, further comprising saving the baseline performance measurements for use with regard to future provisioning requests.

6. The method of claim 1, further comprising:
   establishing baseline performance measurements for each of the multiple different platforms based on performance of the workload on the each of the multiple different platforms; and
   determining the optimal platform based on the baseline performance measurements.

7. The method of claim 6, further comprising saving the baseline performance measurements for use with regard to future provisioning requests.

8. The method of claim 1, wherein the simultaneous placement technique further comprises rotating the entirety of the workload and the simulations through the multiple different platforms.

9. The method of claim 1, further comprising, in response to a platform having the workload thereon being determined to be inferior to a previously tested platform, shifting the workload to another platform and removing the platform as a possible platform for future placements.

10. A system for optimizing workload placement in a networked cloud computing environment, comprising:
   a bus;
   a processor coupled to the bus; and
   a memory medium coupled to the bus, the memory medium comprising instructions to:
      identify a workload on an initial platform in the networked cloud computing environment, the networked cloud computing environment comprising at least one cloud network;
      apply a workload placement technique to identify an optimal platform from multiple different platforms in the at least one cloud network for handling the workload, the workload placement technique comprising an implementation of a plurality of the following: a shadow placement technique, a simultaneous placement technique, and a single platform placement technique, wherein the shadow placement technique comprises a placement of the workload on multiple platforms, wherein the simultaneous placement technique comprises a placement of an entirety of the workload on the multiple different platforms in the at least one cloud network substantially contemporaneously, and wherein the single platform placement technique comprises a placement of the workload on a first single platform of the multiple different platforms in the at least one cloud network in a first time interval and a migration of the workload directly from the first single platform to a second single platform of the multiple different platforms in the at least one cloud network in a second time interval;

apply a workload timing method to determine an optimal time to place the workload on the optimal platform in the at least one cloud network, the workload timing method comprising monitoring central processing unit activity at the initial platform, wherein the optimal time comprises a time at which the central processing unit activity exceeds a predetermined threshold as detected by the monitoring; and place the workload on the optimal platform in the at least one cloud network at the optimal time.

11. The system of claim 10, the memory medium further comprising instructions to gather optimization data based on the workload as placed on the optimal platform.

12. The system of claim 10, the simultaneous placement technique further comprising at least one of:
rotating the placement of the entirety of the workload among the multiple different platforms via a round-robin fashion as non-production simulations of the entirety of the workload are executed on platforms other than the platform on which the entirety of the workload is currently placed, or placing the entirety of the workload on a platform of the multiple different platforms as non-production simulations of the entirety of the workload are executed on platforms other than the platform on which the entirety of the workload is placed.

13. The system of claim 10, the memory medium further comprising instructions to:
establish baseline performance measurements for each of the first single platform and the second single platform based on performance of the workload on the each of the first single platform and the second single platform; and
determine the optimal platform based on the baseline performance measurements.

14. The system of claim 13, the memory medium further comprising instructions to save the baseline performance measurements for use with regard to future provisioning requests.

15. The system of claim 10, further comprising:
establish baseline performance measurements for each of the multiple different platforms based on performance of the workload on the each of the multiple different platforms; and
determine the optimal platform based on the baseline performance measurements.

16. The system of claim 15, the memory medium further comprising instructions to save the baseline performance measurements for use with regard to future provisioning requests.

17. A computer program product for optimizing workload placement in a networked cloud computing environment, the computer program product comprising a non-transitory computer readable storage media, and program instructions stored on the computer readable storage media, to:
identify a workload on a platform in the networked cloud computing environment, the networked cloud computing environment comprising at least one cloud network;
apply a workload placement technique to identify an optimal platform from multiple different platforms in the at least one cloud network for handling the workload, the workload placement technique comprising an implementation of each of the following: a shadow placement technique, a simultaneous placement technique, and a single platform placement technique, wherein the shadow placement technique comprises a placement of the workload on multiple platforms, wherein the simultaneous placement technique comprises a placement of an entirety of the workload on the multiple different platforms in the at least one cloud network substantially contemporaneously, and wherein the single platform placement technique comprises a placement of the workload on a first single platform of the multiple different platforms in the at least one cloud network in a first time interval and a migration of the workload directly from the first single platform to a second single platform of the multiple different platforms in the at least one cloud network in a second time interval;
apply a workload timing method to determine an optimal time to place the workload on the optimal platform in the at least one cloud network, the workload timing method comprising monitoring for another workload that requires placement on the initial platform, wherein the optimal time comprises a time at which the another workload is detected by the monitoring; and
place the workload on the optimal platform in the at least one cloud network at the optimal time.

18. The computer program product of claim 17, further comprising program instructions stored on the non-transitory computer readable storage media to gather optimization data based on the workload as placed on the optimal platform.

19. The computer program product of claim 17, the simultaneous placement technique further comprising at least one of:
rotating the placement of the entirety of the workload among the multiple different platforms via a round-robin fashion as non-production simulations of the entirety of the workload are executed on platforms other than the platform on which the entirety of the workload is currently placed, or
placing the entirety of the workload on a platform of the multiple different platforms as non-production simulations of the entirety of the workload are executed on platforms other than the platform on which the entirety of the workload is placed.

20. A method for deploying a system for optimizing workload placement in a networked cloud computing environment, comprising:
deploying a computer infrastructure being operable to:
identify a workload on an initial platform in the networked cloud computing environment, the networked cloud computing environment comprising at least one cloud network;
apply a workload placement technique to identify an optimal platform from multiple different platforms of the at least one cloud network for handling the workload, the workload placement technique comprising an implementation of each of the following: a shadow placement technique, a simultaneous placement technique, and a single platform placement technique, wherein the shadow placement technique comprises a placement of the workload on multiple platforms, wherein the simultaneous placement technique comprises a placement of an entirety of the workload on multiple different platforms in the at least one cloud network substantially contemporaneously, and wherein the single platform placement technique comprises a placement of the workload on a first single platform of the multiple different platforms in the at least one cloud network in a first time interval and a migration of the workload directly from the first single platform to a second single platform of the multiple different platforms in the at least one cloud network in a second time interval;

apply a workload timing method to determine an optimal time to place the workload on the optimal platform in the at least one cloud network, the workload timing method comprising monitoring for a performance bottleneck on the initial platform, wherein the optimal time comprises a time at which an occurrence of the performance bottleneck is detected by the monitoring; and place the workload on the optimal platform in the at least one cloud network at the optimal time.

\* \* \* \* \*